Figure 2:
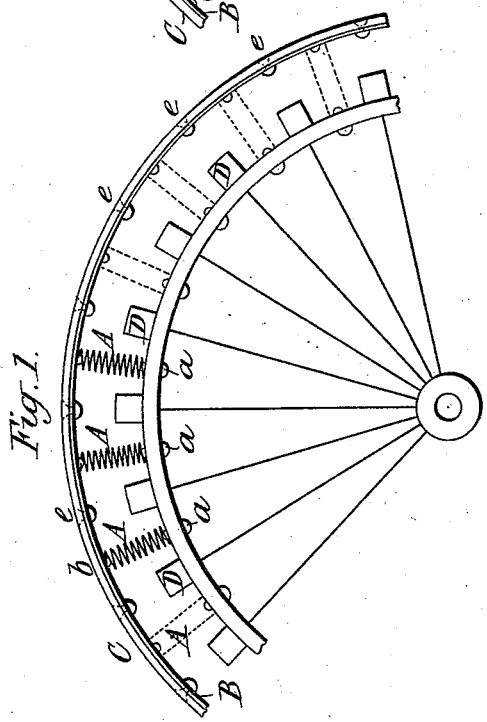

(No Model.) 2 Sheets—Sheet 1.

A. C. BROWN.
WHEEL FOR CYCLES.

No. 504,413. Patented Sept. 5, 1893.

Witnesses.
B. W. Miller.
C. F. Sensner.

Inventor.
Alfred Charles Brown,
By his Attorneys
Baldwin Davidson Wight.

(No Model.) 2 Sheets—Sheet 2.

A. C. BROWN.
WHEEL FOR CYCLES.

No. 504,413. Patented Sept. 5, 1893.

Witnesses.
B. W. Miller
C. F. Sensner

Inventor.
Alfred Charles Brown
By his Attorneys
Baldwin Davidson Wight

UNITED STATES PATENT OFFICE.

ALFRED C. BROWN, OF LONDON, ENGLAND.

WHEEL FOR CYCLES.

SPECIFICATION forming part of Letters Patent No. 504,413, dated September 5, 1893.

Application filed February 9, 1893. Serial No. 461,669. (No model.) Patented in England September 26, 1890, No. 15,228.

*To all whom it may concern:*

Be it known that I, ALFRED CHARLES BROWN, a subject of the Queen of Great Britain and Ireland, residing at No. 129 Algernon Road, Lewisham, London, England, have invented certain new and useful Improvements in Wheels for Cycles and other Vehicles, (for which I have received Letters Patent in England, No. 15,228, dated September 26, 1890,) of which the following is a specification.

The object of my invention is the production of a wheel the extreme outer periphery of which is flexible and highly resilient at all points to forces applied to it radially and which, while it has an elastic tread, is as nearly as possible absolutely rigid against forces applied out of its plane. Such a wheel in its movement readily adapts its outer periphery to the rapidly varying conformation of the ground and obstacles over which it passes without having to vibrate the mass and consequent inertia of any rigid rim or other part having appreciable weight while it retains great side rigidity transmitted right out to the ground to resist side deflection and the consequent side rolling and slipping actions found so disadvantageous with hollow india rubber tires and the spring rims heretofore made. It is also designed so that its resilient action may come into play very sharply and with a minimum of internal friction spent in bending so as by its more perfect elasticity to obtain a reaction tending to press the wheel forward after passing every obstacle which more nearly than formerly equals the opposition which was experienced in front from the same obstacle and thereby to reduce the power wasted on vibration to the lowest possible extent. To accomplish this object I affix at intervals around the outside of the rigid rim of any ordinary wheel a number of outwardly thrusting springs of various forms in such a way that, while they are capable of yielding to forces applied in the plane of the wheel, they each offer a very considerable resistance against side deflection without the aid of side flanges, guide plungers, or other sliding guide surfaces involving friction, or any other forms of springs may be used which can be so made and fixed as to fulfill the above mentioned conditions. The said springs may be designed either to press on the ground separately through any suitable wearing sole pieces or they may be affixed to, and act to thrust out, a band, the essential feature of which is that it shall be flexible in the plane of the wheel but preferably as rigid as possible against edge bending from side strains so as to transmit the latter to the points of attachment of a number of the springs.

The annexed drawings show various optional forms of applying my invention to metallic wheels.

Each figure shows a part side elevation and similar letters refer to similar parts in each figure.

Cycle wheels are shown but my invention may be applied to any forms of wheels.

Figure 1:
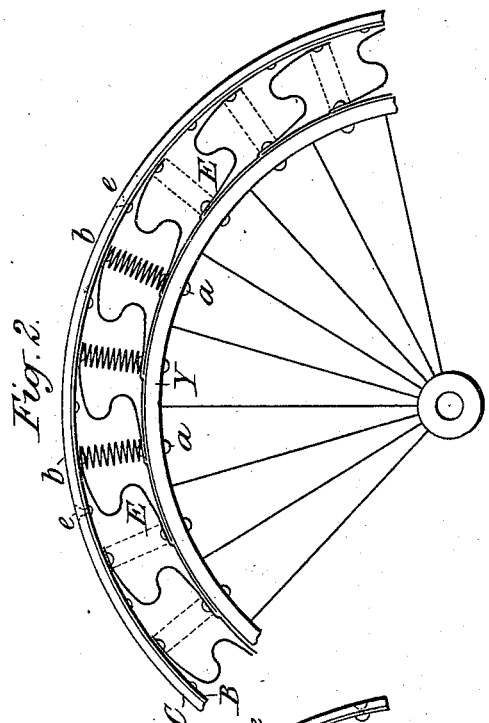

Figure 1 shows one form. It consists of a number of spiral springs, A, made of suitably tempered spring steel wire or its equivalent. The number of springs required depends on the weight to be carried and the particular gage of wire used. I usually place the springs about two and one-half inches apart. These springs are preferably secured to the rigid rim by means of bolts, a, passing through holes in the rim and screwing into nuts or washers shaped so as to grip over or else be themselves gripped by the lower coil of the springs. Or the latter may of course be attached to the rim in any other firm manner so as to strongly resist side deflection but it is desirable that the rim should provide a flat or parallel basis to hold them upright. The two upper edges of an ordinary crescent shaped rim will be found to answer this purpose but an additional side strength can be obtained if a closed crescent section rim be used having a flat top and with holes at its top and bottom to allow the bolts to pass right through. The upper ends of the springs are then attached by bolting or riveting as shown at, b, or in any other firm manner to the flexible band whose edge is shown at, B, B. This consists preferably of a thin flat steel strip. The attaching bolts or rivets are preferably provided with thin heads outside the strip. In order to take the wear on the ground I fix on the outer side of the flat steel band, B, a leather strap shown at, C, of preferably the same width as the steel band. This strap covers the heads of the bolts or rivets, b, and is preferably attached to such band by means of small thin headed rivets or screws and nuts, e, placed midway between the pairs of springs. Rubber or other material of any section may be used as a covering for the outer band but I prefer to use leather. As the band covering is easily renewable it may be used very thin which conduces to economy in power. D, D, show certain blocks or buffers of rubber, cork, or other similar material which may be cemented or otherwise affixed to the rim between the springs to absorb or lessen the final shock in case the springs are abnormally compressed in passing over a very large obstacle. Where spiral springs are used their pitch is so designed that their helices butt together before their breaking strain is reached, and in the manufacture it is desirable to compress them to this extent before they are put on, so that the range of spring used is only that to which it is known they will return after being so compressed, and all chance of subsequent setting is therefore avoided.

Fig. 2 shows the combination of flat strip springs, E, with spiral springs acting on a band as hereinbefore described. This form has a very great side rigidity and is the form I prefer to use for the steering wheels of bicycles and tricycles for heavy weight riders. The strip springs E, E, are made of steel. They are fixed between the spiral springs and the band by the bolts or rivets, b, and each one of them extends down under the root of the next spiral spring as shown and is secured to the rim, Y, by the same bolt, a, which clamps the spiral to the rim. Its tail continues along the rim and is bolted under the next spring, the bolt preferably passing through a longitudinal slot in the tail of the strip spring, instead of a circular opening so as to allow for slight irregularity in the distance apart of the holes in the rim without permitting any side shake. These springs therefore transmit a great transverse strength right out to the ends of the spiral springs, and to the band, while still allowing the latter to deflect quite freely in the plane of the wheel.

Figure 3:
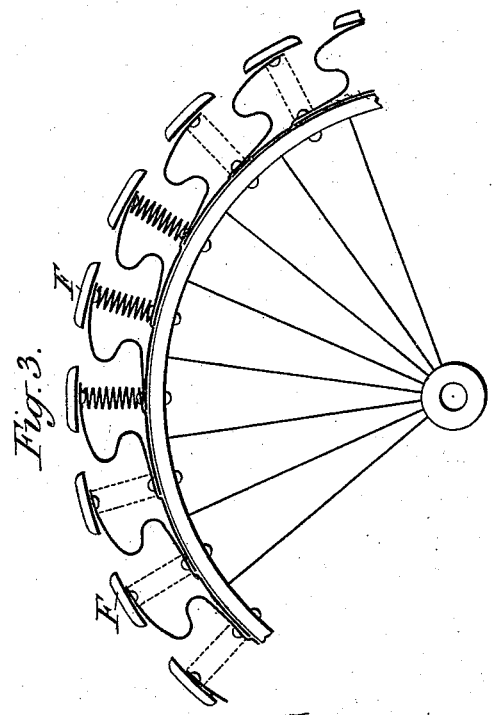

Fig. 3 shows the same combination of springs adapted to run separately on the ground instead of being connected by a band. In this case the springs are tipped with leather or rubber sole pieces as shown at, F, fixed on by riveting or in any other convenient manner.

Figure 4:
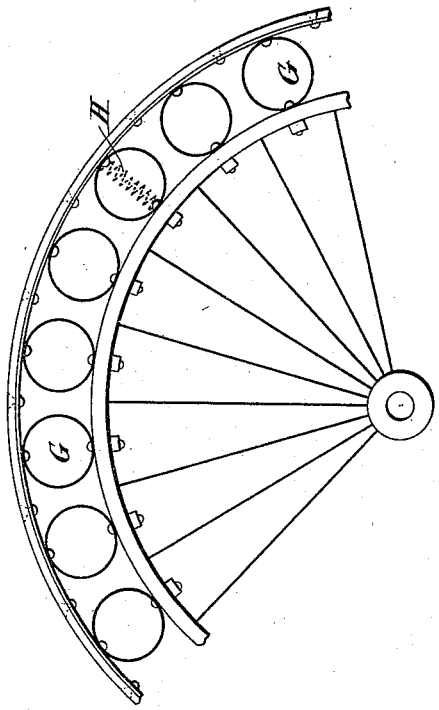
Figure 5:
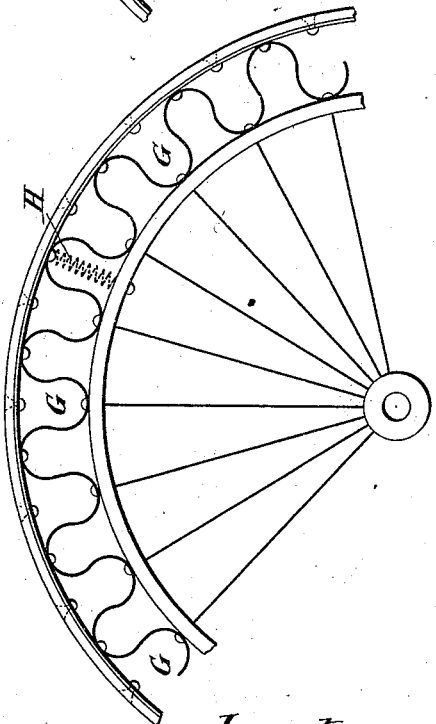

Figs. 4 and 5 show methods of looping strip springs, G, G, for use preferably on light vehicles which are provided with axle springs or spring frames in addition thereto and where a smaller range of elastic tread is therefore sufficient. These forms make light combinations but their safe range is, of course, much less than that of the spirals. The latter may be combined with the loops however shown in Figs. 6 and 7 as well as with the strip springs shown in Figs. 2, 3, 4, and 5, as indicated by the dotted lines, H, H, in Figs. 6 and 7. The loops shown in Fig. 6 may also be rotated into any other plane with reference to the plane of the wheel but are not then so well adapted to resist side strains.

Figure 6:
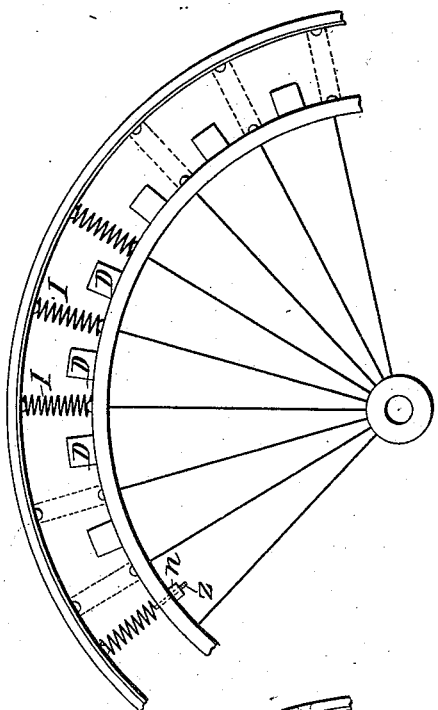

Fig. 6 illustrates a method of forming spiral springs for use as in Fig. 1 on the ends of the spokes themselves where steel spokes are used. These combined spokes and springs, I, may be passed right through the rim (which may then be of tubular or any other section) and screwed directly into the hub. The lower bend of the spring then bears on the rim directly or through a shaped washer and answers the purpose of the ordinary butt head of the spoke. Alternatively shorter pieces of screwed wire, as at, Z, may be left on the spring which may then be screwed into the rim itself or clamped by a nut, n, thereunder, so that the spring extension forms its own bolt as shown.

For carrying heavy weights, volute or deep rectangular or similar sectioned steel coiled springs may be substituted for the spirals in any of the above combinations. For such of the above spring combinations as have great side rigidity separately, the latter quality is not so essential in the band and plain leather or rubber bands may therefore there be used.

Any of the above combinations may be covered in with an envelope of thin leather, rubber, canvas, or other flexible material fixed to and extending between or enveloping the band and the rigid rim.

Elastic tread wheels as described above deriving their resilient power from steel springs and having no rigid rim or other mass having inertia on the ground side of the springs are found to be exceedingly economical of power and capable of preventing the generation of vibration.

Having described my invention, what I claim, and desire to secure by Letters Patent, is—

1. In combination with a wheel having an inner rigid rim, on which springs adapted to outwardly thrust an outer connecting flexible band are secured, blocks or buffers of rubber, cork or its equivalent, such as D, serving to absorb or lessen the final shock in case of abnormal compression of such springs, substantially as set forth.

2. A wheel comprising an inner rigid rim, an outer flexible rim, band or tread, a hub, and a series of metallic spokes, each secured to the hub, extending through the inner rigid rim and secured to the outer rim, each of said spokes being formed with a spiral spring between the outer and the inner rim, substantially as described.

3. A wheel comprising an inner rigid rim, an outer flexible rim, band or tread, a series of bent, wide, flat springs interposed between the inner rim and the outer rim and secured thereto, and a series of coiled or spiral springs also interposed between the inner and the outer rim and secured thereto for the purpose specified.

In testimony whereof I have hereunto subscribed my name.

A. C. BROWN.

Witnesses:
A. F. SPOONER,
W. MAXWELL.